United States Patent [19]

Semprini et al.

[11] Patent Number: 5,302,286
[45] Date of Patent: Apr. 12, 1994

[54] METHOD AND APPARATUS FOR IN SITU GROUNDWATER REMEDIATION

[75] Inventors: Lewis Semprini, Palo Alto; Perry L. McCarty; Peter K. Kitanidis, both of Stanford; Jae-Ho Bae, Sunnyvale, all of Calif.

[73] Assignee: The Board of Trustees of the Leland Stanford Junior University, Palo Alto, Calif.

[21] Appl. No.: 855,351

[22] Filed: Mar. 17, 1992

[51] Int. Cl.⁵ ............................................. C02F 3/02
[52] U.S. Cl. ............................ 210/610; 210/629; 210/747; 210/170; 210/196; 210/220; 166/68; 166/370; 166/372; 261/76; 261/DIG. 75; 138/41
[58] Field of Search .............. 210/170, 747, 150, 151, 210/194, 195.1, 196, 202, 220, 221.2, 258, 259, 610, 620, 621, 629, 631, 901; 166/267, 370, 372, 68; 261/DIG. 75, 76, 94, 116; 138/40, 41, 44

[56] References Cited

U.S. PATENT DOCUMENTS

| Re. 33,102 | 10/1989 | Visser et al. | 166/267 |
|---|---|---|---|
| 1,398,063 | 11/1921 | Brown | 138/44 |
| 1,401,609 | 12/1921 | Klein | 138/41 |
| 2,774,583 | 12/1956 | Haftke | 261/116 |
| 3,794,303 | 2/1974 | Hirshon | 261/DIG. 75 |
| 4,322,292 | 3/1982 | Knox | 261/DIG. 73 |
| 4,401,569 | 8/1983 | Jhaveri et al. | 210/170 |
| 4,411,780 | 10/1983 | Suzuki et al. | 261/DIG. 75 |
| 4,593,760 | 6/1986 | Visser et al. | 166/267 |
| 4,755,304 | 7/1988 | Hallberg et al. | 210/747 |
| 4,832,122 | 5/1989 | Corey et al. | 166/266 |
| 4,886,119 | 12/1989 | Bernhardt et al. | 166/242 |
| 4,892,688 | 1/1990 | Bernhardt | 261/24 |
| 4,943,305 | 7/1990 | Bernhardt | 55/170 |
| 4,992,174 | 2/1991 | Caplan et al. | 210/170 |
| 5,017,289 | 5/1991 | Ely et al. | 210/747 |
| 5,143,606 | 9/1992 | Bernhardt | 210/170 |

FOREIGN PATENT DOCUMENTS 3805200 of 1988 Fed. Rep. of Germany.
3811962 11/1988 Fed. Rep. of Germany.

OTHER PUBLICATIONS

"Examination of venting for removal of gasoline vapors from contaminated soil," prepared by Texas Research Institute, Inc., for the American Petroleum Institute, Mar. 1980 (reprinted in *Groundwater Research*, 1986).

"In-situ remediation of volatile contaminants in groundwater by a new system of Underpressure-Vaporizer-Wells", Herrling, B., et al., Proceedings of the Conference of Subsurface Contamination by Immiscible Fluids, Calgary, Apr. 1990.

*Primary Examiner*—Christopher Upton
*Attorney, Agent, or Firm*—Heller, Ehrman, White & McAuliffe

[57] ABSTRACT

A system for in-situ bioremediation includes a well extending into a saturated zone. The well includes a casing having two permeable sections in the saturated zone. Groundwater may be recirculated through the well and the saturated zone between the two permeable sections. Nutrients, such as oxygen and methane, may be added to the groundwater as it flows in the well. A venturi transfer device may be used to supply the nutrients.

21 Claims, 3 Drawing Sheets

METHOD AND APPARATUS FOR IN SITU GROUNDWATER REMEDIATION

The U.S. Government has rights in the invention disclosed and claimed herein pursuant to Environmental Protection Agency Contract No. EPA815738.

BACKGROUND OF THE INVENTION

The present invention relates in general to remediation of contaminated groundwater. It relates in particular to an in-situ method of bioremediation, including adding biological nutrients to the groundwater.

Existing methods for bioremediation of contaminated groundwater involve bringing the contaminated groundwater from an aquifer to ground level for treatment. The treated groundwater is then returned to the aquifer. The treatment may include adding gaseous nutrients, such as oxygen and methane, to the groundwater to accelerate the biological decomposition of contaminants in the groundwater.

Bringing contaminated groundwater to the surface for treatment may, however, present certain problems. For example, the nature of the contamination may be such that, for safety reasons, it may be preferable not to even bring the contaminated groundwater to the surface. Additionally, temporary storage must be provided on the surface for groundwater while it is being treated. Bureaucratic problems in obtaining permits to bring the water to the surface may also be significant. Such problems may add considerably to the treatment cost. Further, nutrients may not be easily added to the groundwater under standard conditions of temperature and atmospheric pressure. This may further increase the time and cost of the treatment.

Accordingly, it is an object of the present invention to provide a system for in situ treatment of contaminated groundwater.

It is a further object of the present invention to provide an in situ system for efficiently adding nutrients, such as oxygen, to contaminated groundwater.

SUMMARY OF THE INVENTION

The present invention is directed to a system for in-situ remediation of groundwater. The system may include a well extending downward into a saturated zone. The well includes a casing having first and second permeable sections located in the saturated zone. The first permeable section is located at a predetermined depth in the well, and the second permeable section is located above the first permeable section. The system includes means for causing groundwater to flow out of the well through the first permeable section and back into the well through the second permeable section. The system also includes means for adding gaseous nutrients to the groundwater as it flows through the well. Soluble nutrients such as nitrate, acetate or methanol, may also be added by injecting a solution of such nutrients.

Groundwater may be forced down the well by a pump in a recirculating unit. An aerator is provided for adding biological gaseous nutrients, such as oxygen and methane, in gaseous form to the groundwater as it recirculates. The aerator includes a venturi section. Gaseous nutrients or soluble nutrients in solution may be injected into the venturi section.

The aerator may also be used in other types of groundwater remediation systems other than a recirculation system.

In another embodiment, the casing may include a third screen located in the vadose zone for providing gas-stripping of chlorinated aliphatics from the groundwater, and biological treatment through nutrient addition.

In yet another embodiment, two wells are provided. A first well extends into the saturated zone to a first level, and a second well extends into the saturated zone to a second level located below the first level. The first well and the second well are connected to allow water to flow from one to the other. Groundwater may be recirculated by pumping it from the first well to the second. An aerator is used to add nutrients to the groundwater. The groundwater may also be recirculated by pumping it from the second well into the first well.

DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
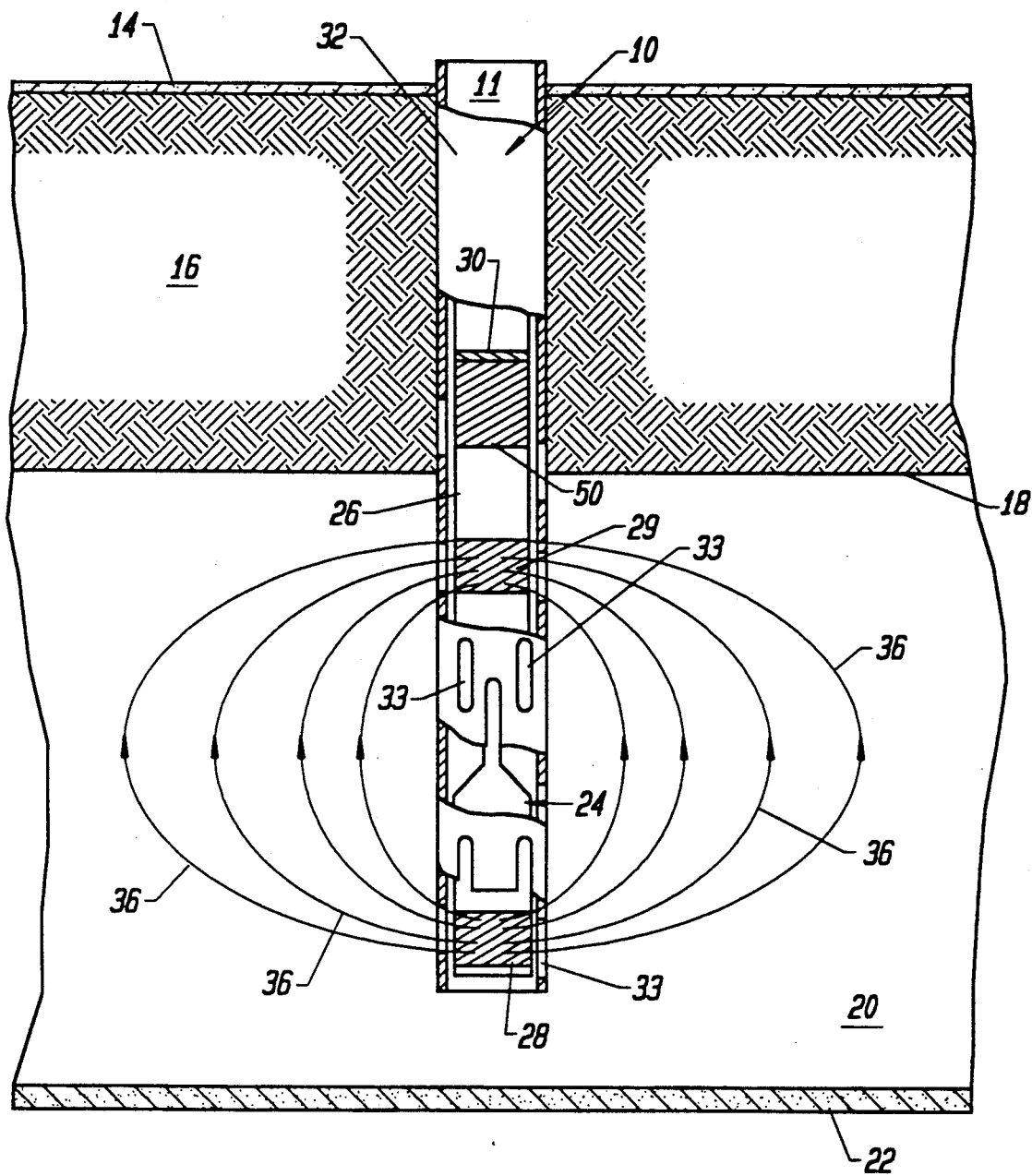
FIG. 1 schematically illustrates a well including the in-situ groundwater recirculating system of the present invention.
Figure 2:
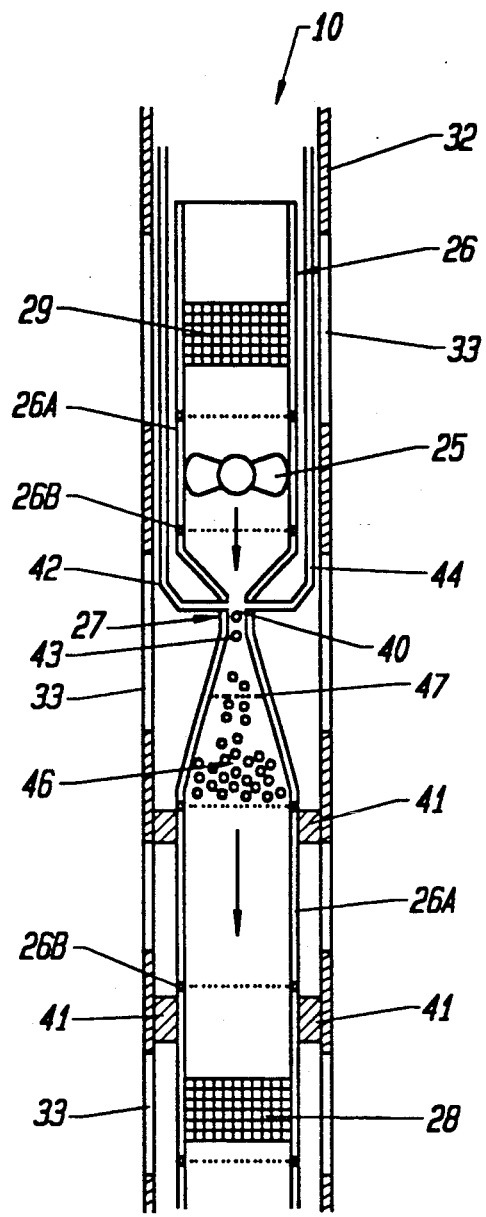
FIG. 2 schematically illustrates details of the in-situ groundwater recirculating system of the present invention including an aerator.

Turning now to the drawings, wherein like components are designated by like reference numerals throughout the various figures, FIGS. 1 and 2 show a well 10. The well or well borehole extends from ground level 14, through vadose zone 16, and into a saturated zone 20 below water table 18 containing the groundwater. The lower extremity of saturated zone 20 may be defined by an impervious zone or aquitard 22. Recirculating unit or system 24 (See also FIG. 2) may include an inner casing 26 extending into the well near the bottom thereof. The casing has two permeable sections 28 and 29. Sections 28 and 29 may be screened sections that permit groundwater water to enter and leave casing 26. Well 10 may be sealed by means of a seal 30 in the top 11 thereof to prevent the escape of contaminated gases from the well. Casing 26 may be surrounded by an outer protective casing 32 which extends the length of the well borehole. Casing 32 may have slots 33 at least along the portion thereof located in saturated zone 20. As such, screened sections 28 and 29 may be in fluid communication with the groundwater in saturated zone 20. Casing 26 may be held in position in outer casing 32 by packers 41.

As shown in FIG. 2, recirculating unit 24 may include a pump 25 located within casing 26 between screened sections 28 and 29. As will be discussed below, casing 26 may be configured to provide a venturi-shaped aerator, designated generally by reference numeral 27 in FIG. 2. Pump 25 may be positioned above the aerator. Pump 25 is preferably a variable flow pump. Pump 25, for example, may be capable of pumping water at a rate of about twenty-four gallons per minute (GPM) against a pressure head of twenty-five feet of water.

Permeable section 28 is preferably located near bottom 13 of well 10 and permeable section 29 is located a distance above section 28. Screened section 28 is located above aquitard 22. For example, for a well having a diameter of about one foot, and in conditions where water table 18 is located at about thirty feet below ground surface 14 and aquitard 22 is located at about 45 feet below the water table, sections 28 and 29 may each have a length of about three feet. Section 29 is preferably located at about 25 feet above section 28, and section 28 is located about three feet above the aquitard. As such, section 29 is located about eleven feet below water table 18.

Permeable section placement and pump size selection may be affected by parameters including depth of the saturated zone, the water table level, and geological conditions such as the hydraulic conductivity of the saturated zone. Accordingly, it is preferable that recirculation unit 24 is designed so casing 26 can be adjusted to alter the position of screened sections 28 and 29 in the well. Also, it is desirable that the casing and components of the recirculation unit be easily removable from the well for maintenance purposes. As such, to simplify adjusting the relative position of screened sections 28 and 29, casing 26 may be fabricated from individual cylindrical sections 26a, joined at points 26b. Each section 26a may have a length of about five feet. The sections may be joined such as by welding at junctions 26b. Removal of recirculating unit 24 for modification and maintenance may be facilitated by locating it within outer casing 32, which remains fixed in well 10.

As shown in FIG. 1, groundwater is recirculated downwardly in well 10 by means of pump 25. The groundwater is forced by the pumping action through screened section 28 into saturated zone 20. Groundwater forced out of screened section 28 rises through saturated zone 20, and recirculates into well 10 through screened section 29.

A hydraulic model has been used to simulate groundwater flow through a saturated zone 20. The model was based on a recirculating unit having a pump capable of pumping 25 gallons per minute against a 25-foot head of water, and a 25 foot separation between screen sections 28 and 29. It was also assumed the water table 18 was thirty feet below ground, and aquitard 22 was forty-five feet below the water table. Screened section 29 was assumed to be eleven feet below the water table 18, and saturated zone 20 was also assumed to be an aquifer having no regional groundwater flow in the region of the well. The aquifer was assumed to include an isotropic medium having a hydraulic conductivity of about $1 \times 10^{-4}$ meters per second (m/s). The position of pump 25 was such to produce a pressure decrease of 12.5 feet of water above the pump, and a pressure increase of 12.5 feet of water below the pump, at the above-described flow rate of twenty-five gpm.

Referring again to FIG. 1, streamlines 36 are predicted by the hydraulic model as representing a flow pattern of water through saturated zone 20. The model predicts that about 50 percent of the groundwater may flow within an elliptical radius, between permeable sections 28 and 29, of about seven meters around well 10, and ninety percent of the groundwater may flow within an elliptical radius of about twenty meters around well 10.

Gaseous nutrients, such as oxygen and methane, may be injected in gaseous form directly into groundwater as it is recirculated. The injection of the nutrients may be accomplished by the use of an aerator. The aerator facilitates nutrient injection by the formation of a bubble swarm. The aerator 27 is located in casing 26 below pump 25 and above section 28. A preferred aerator is a venturi aerator. A detailed description of venturi aerators used for gas absorption is given in *Perry's Chemical Engineers Handbook*, 6th Ed., pages 14-39 (1984). A description of a venturi aerator useful in the present invention is set forth below.

The venturi aerator may also be used in other types of groundwater remediation systems (other than a recirculation system) such as infiltration galleries. The aerator may also be used to add soluble nutrients, such as nitrate, acetate and methanol, in solution.

Referring again to FIG. 2, venturi aerator 27 is shown formed by a portion of casing 26 of recirculating unit 24. Aerator 27 includes a throat section 40 through which groundwater may be forced by pump 25. Groundwater flow through throat 40 may be relatively rapid. For example, a throat diameter of about one inch may cause a flow velocity of about ten feet per second (ft/sec) through the throat section, under the above-exemplified pumping conditions of about twenty-five GPM.

Methane and oxygen or, as noted, soluble nutrients in solution may be injected into throat 40 or in the vicinity thereof to form bubbles 43 in groundwater flowing therethrough. Methane and oxygen may be transported from the surface to the throat section through tubes or conduits 42 and 44, respectively. Rapid groundwater flow in the region of throat section 40 forces the bubbles downward into region 46 of aerator section 27, where groundwater flow slows due to the increasing diameter of the venturi section. A mixing device such as a perforated plate 47 may be located in the venturi, downstream of the throat section, to further enhance the dissolution of gases. As groundwater flow slows, the bubbles are able to rise against the flow. Thus, bubbles become trapped within region 46 forming a bubble swarm therein. As bubbles cannot escape, they eventually dissolve. An advantage of placing the aerator relatively deep below the water table is that the pressure in region 46 is naturally high due to the immersion depth, and is further augmented by the overpressure due to the operation of pump 25. Gas bubbles are more effectively dissolved with increasing pressure.

Preferable ranges for concentration of the dissolved methane and oxygen are between about 2.5 and 6.0 milligrams per liter (mg/l) for methane, and between about 10.0 and 25.0 mg/l for oxygen. In order to achieve these concentrations, at a flow rate of twenty five gpm, a temperature of 0° C., and a pressure of one atmosphere (ATM), it may be necessary to inject between about 0.34 and 0.80 liters per minute (l/min), at standard temperature and pressure (STP) of methane, and between about 0.67 and 1.6 l/min at STP of oxygen. For a flow rate of twenty-five GPM, at a temperature of 10° C., and a pressure of 2.5 ATM, it may be preferable to inject between about 0.13 and 0.32 l/min at STP of methane, and between about 0.27 and 0.64 l/min at STP of oxygen.

In another configuration, recirculation unit 24 may also be used for gas-stripping volatile hydrocarbons such as chlorinated aliphatics from groundwater. Gas-stripping is a known technique for removing volatile hydrocarbons form groundwater. It involves causing a stream of bubbles to flow through the groundwater to accumulate volatile hydrocarbons. The bubbles are allowed to rise slowly through the water to accumulate the hydrocarbons. When the bubbles reach the water table level 18, hydrocarbon vapors are released into vadose zone 16 where they may be collected and then destroyed or treated. For example, a methanthropic biostimulated zone may be established in vadose zone 16 for biologically degrading the chlorinated aliphatics, through methane and oxygen addition.

Referring again to FIG. 1, recirculation unit 24 may include a third screened section 50 disposed in vadose zone 16. The screened section 50 would permit recirculation unit 24 to be used for gas-stripping volatile hydrocarbons from the groundwater. In such an application, venturi 27 would be replaced by a section of standard casing 26a. A mixture of methane and air would be injected via a conduit or conduits directly into the recirculating groundwater between screened sections 28 and 29. The recirculating unit would be operated in a downflow mode as above-described. In the absence of venturi 27, downflow would be relatively low. As such, bubbles would be able to rise in the downward flowing groundwater. The downward flow, however, would cause the bubbles to rise slowly, and increase the time that they were immersed in the groundwater. The longer immersion time would increase the probability of accumulating the chlorinated aliphatics in the bubbles. Upward bubble flow may be further restricted by including one or more baffles or restrictions (not shown) within casing 26, above pump 25, further increasing the immersion time of the bubbles. When the bubbles reach the surface of groundwater (water table level 18) in the well, they may be discharged into vadose zone 16 through screened section 50.

The third permeable section 50 may also be used in the embodiment including aerator 27 to periodically purge gas from the system. This would be done in order to remove gases, such as nitrogen, found in groundwater that may build up in the aerator.

Figure 3:
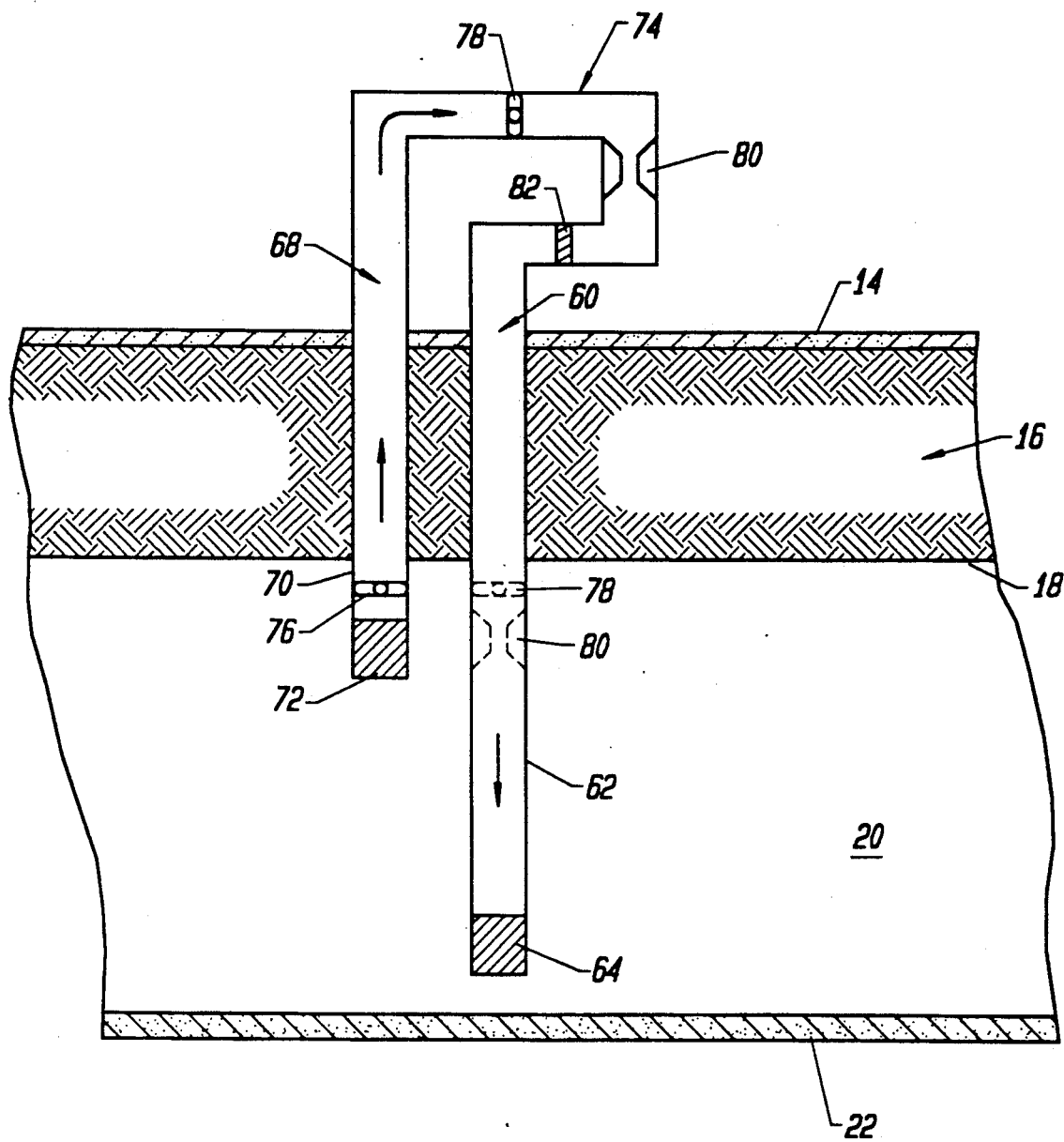
FIG. 3 schematically illustrates an in-situ groundwater recirculating system according to the present invention for recirculating water between two wells.

In another embodiment of the present invention, two wells may be provided for causing recirculation of the groundwater. Referring to FIG. 3, a well 60 extends into saturated zone 20. Well 60 includes a casing 62 having a screened section 64 at the bottom thereof. Well 60 preferably extends to a level relatively close to aquitard 22. A second well 68 extends into saturated zone 20. Well 68 includes a casing 70 having a screened section 72 at the bottom thereof. Screened section 72 may be located just below water table 18, i.e., at a level in saturated zone 20 above screened section 64. For general guidelines on a preferable location levels for screened sections 64 and 72, the discussion above regarding exemplary dimensions may be used.

At the top of wells 60 and 68, a connecting section, channel or conduit 74 connects the wells such that they are in fluid communication with each other. As such, water may be transferred through connecting section 74 from one well to the other. In a preferred operating mode, groundwater is recirculated through saturated zone 20, and wells 60 and 68 by pumping water from well 68 to well 60. A pump 76, located within casing 70 of well 68, draws groundwater from saturated zone 20 into well 68 via section 72 and pumps it into connecting section 74. Another pump 78 may be located in connecting section 74 for boosting the recirculation action. Connecting section 74 may also include an aerator 80, which is preferably a venturi aerator as described above. The venturi aerator provides for increased water flow so bubbles cannot rise against the flow. The action of pumps 76 and 78 forces groundwater through aerator 80 where gaseous nutrients may be added. Connecting section 74 may include a filter for filtering solid matter from the recirculating groundwater. The pumping action also forces the groundwater down well 60 and out of screened section 64 to complete the recirculation cycle.

While the last-described embodiment may be more complex than the embodiment of FIG. 1, it may be preferred in exploratory applications, wherein uncertainty about geological conditions may require a certain amount of experimentation with parameters such as flow rates and aerator throat dimensions. While aerator 80 is described as being located in connection section 74, i.e., above ground level 14, it will be evident, in view of foregoing discussions, that pump 78 and aerator 80 (as shown in phantom) may also be located within well 60 below water table 18.

In summary, a method of recirculating groundwater for remediation, including adding biological nutrients in gaseous form or in solution to the groundwater, has been described. The present invention provides for dissolution of the nutrients in the groundwater. This is accomplished by using a pump for forcing groundwater down a well and out of its base, and recirculating the groundwater through the saturated zone back to the well. A venturi aerator is located on the high pressure, i.e., output side of the pump, at which the nutrients may be added. Locating the aerator on the high pressure side increases the efficiency of dissolution of the nutrients in the recirculating groundwater.

The present invention has been described in terms a number of embodiments. The invention, however, is not limited to the embodiments described and depicted. Rather, the scope of the invention is defined by the appended claims.

What is claimed is:

1. Apparatus for in-situ recirculation of groundwater, comprising:
   a well extending downward into a saturated zone;
   a casing having first and second permeable sections located in said saturated zone;
   said first permeable section located at a predetermined depth in the well and said second permeable section located above said first permeable section;
   means for causing groundwater to flow out of the well between said first permeable section and said second permeable section; and
   means for adding nutrients to the groundwater as it flows through the well, said nutrient-adding means including a passageway in the well between said first and second permeable sections for the flow of groundwater with a downward component therethrough, said passageway having a throat section located between two tapered sections, and said throat section sufficiently narrow to allow water to flow therethrough and to prevent upward movement of bubbles confined therebeneath, and a conduit means for transporting nutrients to said passageway in the vicinity of said throat section as the groundwater flows therethrough.

2. The apparatus of claim 1 wherein said casing includes a third permeable section located in a vadose zone.

3. The apparatus of claim 1 further including a seal located in said well above said saturated zone for preventing gases from escaping from the well.

4. The apparatus of claim 1 wherein said groundwater flow causing means includes a pump means located in the well between said second permeable section and said throat section.

5. The apparatus of claim 1 wherein said nutrients are injected into said throat section.

6. The apparatus of claim 1 wherein said casing is fabricated from a plurality of cylindrical sections.

7. The apparatus of claim 1 wherein said casing is located within an outer casing extending into the saturated zone, said outer casing having slots in at least a portion thereof located in said saturated zone.

8. An apparatus for in-situ recirculation of groundwater, comprising:
a first well extending into a saturated zone to a first level;
a second well extending into saturated zone to a second level below said first level;
means for providing fluid communication between said first and said second wells;
means for recirculating groundwater through said fluid communication means, and between said first and second wells; and
means for adding nutrients to the recirculating groundwater, said nutrient-adding means including a passageway for the flow of groundwater with a downward component therethrough, said passageway having a throat section located between two tapered sections, and said throat section sufficiently narrow to allow water to flow therethrough and to prevent upward movement of bubbles confined therebeneath, and a conduit means for transporting nutrients to said passageway in the vicinity of said throat section as the groundwater flows therethrough.

9. The apparatus of claim 8 wherein said nutrient-adding means is located in said fluid communication means.

10. The apparatus of claim 8 wherein said nutrient-adding means is located in said second well in said saturated zone.

11. The apparatus of claim 8 wherein said fluid communication means includes a filter.

12. The apparatus of claim 8 wherein said recirculating means includes a first pump located in said first well.

13. The apparatus of claim 12 wherein said recirculating means further includes a second pump located in said fluid communication means.

14. The apparatus of claim 8 wherein said recirculating means includes a pump located in said second well and said nutrient-adding means is located in said second well below said pump.

15. The apparatus of claim 8 wherein said recirculating means includes a casing having a permeable section for the flow of water into said wells.

16. A method for in-situ treatment of contaminated groundwater, comprising:
(a) providing a well extending toward a saturated zone;
(b) recirculating groundwater through said well by flowing groundwater down said well and out of said well at a first level, and drawing groundwater water into said well at a second level above said first level;
(c) providing a passageway for the flow of groundwater with a downward component, having a throat section located between two tapered sections in the well between said first and second levels, and said throat section sufficiently narrow to allow water to flow therethrough and to prevent upward movement of bubbles confined therebeneath; and
(d) adding nutrients to said groundwater in the vicinity of said throat section as it flows through said passageway.

17. A method for in-situ treatment of contaminated groundwater, comprising:
(a) providing a first well extending downward below a water table into a saturated zone to a first level;
(b) providing a second well extending below said water table into said saturated zone to a second level below said first level;
(c) connecting said wells so they are in fluid communication;
(d) causing groundwater to flow through said saturated zone between said first and second wells;
(e) providing a passageway having a throat section located between two tapered sections so groundwater flowing in said wells flows with a downward component through said passageway, said throat section being sufficiently narrow to allow water to flow therethrough and to prevent upward movement of bubbles confined therebeneath; and
(f) adding nutrients to said groundwater in the vicinity of said throat section as it flows through said passageway.

18. The method of claim 17 wherein step (e) includes drawing groundwater into said first well, flowing the groundwater between said first and second wells, and forcing the groundwater down said second well and out of the bottom thereof.

19. An apparatus for treatment of contaminated groundwater, comprising:
a well extending toward the contaminated groundwater; and
means disposed in the well for adding nutrients to the groundwater, said nutrient-adding means including:
(i) a passageway for the flow of groundwater, with a downward component, therethrough,
(ii) a constricted throat section in said passageway, said throat section being sufficiently narrow to allow water to flow therethrough and to prevent upward movement of bubbles confined therebeneath,
(iii) a tapered section located adjacent to and on opposite sides of said throat section, and
(iv) conduit means for adding the nutrients to the groundwater in the vicinity of said throat section as it flows through said passageway.

20. The apparatus of claim 19 further including a mixing means disposed in said passageway downstream of said throat section for mixing the nutrients with the groundwater.

21. The apparatus of claim 20 wherein said mixing means is a perforated plate.

* * * * *

UNITED STATES PATENT AND TRADEMARK OFFICE
CERTIFICATE OF CORRECTION

PATENT NO. : 5,302,286
DATED : April 12, 1994
INVENTOR(S) : Lewis Semprini, et. al.

It is certified that error appears in the above-indentified patent and that said Letters Patent is hereby corrected as shown below:

```
Column 2, line 63, after "packers 41" insert -(see FIG. 2)--.
Column 3, line 8, delete "13".
Column 3, line 39, after "pump 25" insert -(see FIG. 2)--.
Column 5, line 57, delete "a".
Column 6, line 1, Claim 1, replace "Apparatus" with -- An apparatus--.
```

Signed and Sealed this

Third Day of January, 1995

Attest:

BRUCE LEHMAN

*Attesting Officer*      *Commissioner of Patents and Trademarks*